US010821523B2

(12) United States Patent
Wagner et al.

(10) Patent No.: US 10,821,523 B2
(45) Date of Patent: Nov. 3, 2020

(54) COUNTER BEARING FOR MACHINING SPINDLES OF MACHINE TOOLS AND METHOD FOR CLAMPING COUNTER BEARINGS AND TOOLS

(71) Applicant: Michael Weinig AG, Tauberbischofsheim (DE)

(72) Inventors: Ralf Wagner, Hardheim (DE); Rainer Gramlich, Ravenstein (DE)

(73) Assignee: Michael Weinig AG, Tauberbischofsheim (DE)

( * ) Notice: Subject to any disclaimer, the term of this patent is extended or adjusted under 35 U.S.C. 154(b) by 0 days.

(21) Appl. No.: 15/981,944

(22) Filed: May 17, 2018

(65) Prior Publication Data
US 2018/0333787 A1 Nov. 22, 2018

(30) Foreign Application Priority Data
May 17, 2017 (DE) .......................... 10 2017 004 994

(51) Int. Cl.
*B23B 31/30* (2006.01)
*B23B 31/26* (2006.01)

(52) U.S. Cl.
CPC .......... *B23B 31/261* (2013.01); *B23B 31/302* (2013.01); *B23B 31/305* (2013.01); *B23B 2231/26* (2013.01); *B23B 2260/026* (2013.01)

(58) Field of Classification Search
CPC .......... B23B 2231/26; B23B 2260/008; B23B 2260/026; B23B 2260/088; B23B 2260/142; B23B 2270/483; B23B 31/261; B23B 31/302; B23B 31/305; Y10T 279/1216; Y10T 279/1241; Y10T 279/1283
See application file for complete search history.

(56) References Cited

U.S. PATENT DOCUMENTS

| | | | | |
|---|---|---|---|---|
| 3,250,542 A | * | 5/1966 | Winnen | B23B 31/305 279/2.08 |
| 3,388,917 A | * | 6/1968 | Winnen | B23B 31/305 279/4.03 |
| 3,592,482 A | * | 7/1971 | Better | B23B 31/305 279/4.06 |
| 3,770,287 A | * | 11/1973 | Weber | B23B 31/402 279/2.02 |

(Continued)

FOREIGN PATENT DOCUMENTS

| | | |
|---|---|---|
| DE | 24 24 593 | 10/1975 |
| DE | 40 12 980 | 10/1991 |

(Continued)

*Primary Examiner* — Nicole N Ramos
(74) *Attorney, Agent, or Firm* — Gudrun E. Huckett

(57) ABSTRACT

A counter bearing for machining spindles of machine tools has at least one expansion bushing with an elastically deformable wall that delimits at least one pressure chamber. The pressure chamber accommodates a pressure medium. A supply line for the pressure medium opens into the pressure chamber. A pressure conduit opens into the pressure chamber. A mechanically actuatable pressure element is disposed in the pressure conduit and actuated by an actuating tool. A piston is slidably arranged in the pressure conduit and actuated by the pressure element, wherein the piston loads the pressure medium.

18 Claims, 4 Drawing Sheets

(56) References Cited

U.S. PATENT DOCUMENTS

| | | | | |
|---|---|---|---|---|
| 4,147,312 | A | * | 4/1979 | Secor .................. B65H 75/243 |
| | | | | 242/576.1 |
| 4,533,287 | A | | 8/1985 | Hagemeyer et al. |
| 4,580,796 | A | * | 4/1986 | Baur .................... B23B 31/204 |
| | | | | 279/4.02 |
| 4,697,966 | A | * | 10/1987 | Baur .................. B23B 31/4073 |
| | | | | 279/4.01 |
| 5,141,370 | A | * | 8/1992 | Baumann .............. B23B 31/305 |
| | | | | 279/2.08 |
| 5,221,098 | A | * | 6/1993 | Ayzenshtok .......... B23B 31/302 |
| | | | | 279/4.01 |
| 5,388,487 | A | * | 2/1995 | Danielsen ............... B23B 29/04 |
| | | | | 279/2.08 |
| 5,435,577 | A | * | 7/1995 | Bauer .................. B23B 31/302 |
| | | | | 279/4.01 |
| 6,299,179 | B1 | * | 10/2001 | Sheffer ................ B23B 31/001 |
| | | | | 279/121 |
| 7,914,010 | B2 | * | 3/2011 | Herud .................. B23B 31/028 |
| | | | | 279/156 |

FOREIGN PATENT DOCUMENTS

| | | |
|---|---|---|
| DE | 42 24 872 | 2/1994 |
| KR | 20110069633 | 6/2011 |

* cited by examiner

COUNTER BEARING FOR MACHINING SPINDLES OF MACHINE TOOLS AND METHOD FOR CLAMPING COUNTER BEARINGS AND TOOLS

BACKGROUND OF THE INVENTION

The invention relates to a counter bearing for machining spindles of machine tools, in particular wood working machines, preferably moulding machines, with at least one expansion bushing whose elastically deformable wall delimits at least one pressure chamber that accommodates a pressure medium and into which opens a supply line for the pressure medium. The invention also relates to a method for clamping counter bearings and tools on machining spindles of machine tools, in particular wood working machines, preferably moulding machines, in which a pressure chamber delimited by an elastically deformable wall is filled with a pressure medium.

For clamping counter bearings of spindles, clamping devices are known which are provided with expansion bushings. They each comprise an elastically deformable wall that delimits an annular pressure chamber. A pressure medium, preferably grease, is introduced with pressure into the pressure chambers. When the counter bearing is to be clamped on the spindle, a high-pressure grease press is connected to a corresponding connector with which the grease is pumped at high pressure into the pressure chamber. For releasing the clamping action, a valve is opened through which a portion of the grease is discharged. Clean working is not possible with such a clamping device. The grease reaches the exterior and causes a contamination not only during the clamping process but also during the release process. Also, the use of a high-pressure grease press for clamping the counter bearing on the spindle is very complex.

The invention has the object to design the counter bearing of the aforementioned kind and the method of the aforementioned kind in such a way that a simple, reliable, and clean clamping as well as release process is possible.

SUMMARY OF THE INVENTION

This object is solved for the counter bearing of the aforementioned kind in accordance with the invention in that into the pressure chamber a pressure conduit opens in which a mechanically actuatable pressure element actuatable by means of a tool is seated, by means of which a piston loading the pressure medium is slidable. The object is solved for the method of the aforementioned kind in accordance with the invention in that a pressure chamber delimited by an elastically deformable wall is initially filled with a pressure medium, in that the pressure medium during the clamping process is pressurized by a piston that is mechanically moved by a pressure element, wherein by means of a pressure indicator the adjustment of the clamping pressure is indicated.

The counter bearing according to the invention is characterized by a closed system for the clamping action. In order to pressurize the pressure medium for the clamping process, the pressure element is mechanically actuated by means of a tool so that a piston is displaced in the direction toward the pressure chamber and causes the pressure medium contained therein to be pressurized. In this way, a simple and quick clamping action without use of a grease press is possible with a simple tool, for example, a socket wrench.

Advantageously, the pressure element is seated in a threaded bore. In this way, it is possible to turn the pressure element continuously with the tool such that the required clamping pressure is achieved. When the clamping action is to be released, the pressure element is turned oppositely so that the piston is also moved back and the pressure acting on the pressure medium is reduced.

In a constructively very simple embodiment, the pressure element is formed by a threaded pin which is screwed into the threaded bore.

In order for the pressure medium to be pressurized reliably in the pressure chamber, the piston is arranged to be slidable seal-tightly in a piston chamber.

Advantageously, the pressure chamber is connected to a pressure indicator by a conduit. In this way, the user when adjusting the clamping pressure, can very simply determine whether the required clamping pressure is achieved.

The pressure indicator advantageously comprises a plunger which is seated in a bore which opens into the pressure chamber and is slidable seal-tightly in the bore. When the pressure medium is pressurized in the pressure chamber by means of the pressure element, the medium pushes against that the end face of the plunger which is acting as a piston and is displaced in accordance with the applied pressure. In this way, it can be very simply determined by means of the position of the plunger whether the required clamping pressure has been reached.

The plunger is advantageously spring-loaded in the direction toward the pressure chamber. As a result of the spring load, the plunger is in an initial position when the pressure medium is not pressurized. During the clamping process, the plunger is displaced against the spring load until force equilibrium between the piston force and the spring force exists.

Advantageously, the plunger is surrounded by a plate spring stack. It is supported with one end against a plunger-associated stop and with the other end against a securing part. Since very high pressures are required for clamping, for example, approximately 300 bar, the spring plate stack provides correspondingly high spring forces acting on the plunger in the direction toward the pressure chamber.

In a constructively simple embodiment, the securing part for supporting the spring plate stack is a threaded sleeve which is screwed into a threaded bore. The threaded sleeve has a through opening into which the plunger projects. In this way, it is very simply possible for the user to determine the position of the plunger in the threaded sleeve. The adjustment of the spring force, in particular of a plate spring force, and the piston force which is exerted by the pressure medium are selected advantageously such that upon reaching the clamping force the end face of the plunger is positioned at the level of the end face of the threaded sleeve. This position of the plunger, which is positioned still within the threaded sleeve in the initial position, can be reliably detected by the user.

The expansion bushing in an advantageous embodiment is arranged in a bearing hub of the counter bearing.

However, it is also possible to provide the expansion bushing in a tool in order to fasten the tool on a spindle.

In both cases, the closed system enables a clean and reliable clamping action of the bearing hub of the counter bearing or of the tool on the spindle.

For initial filling of the pressure chamber, the clamping device is provided with a connector by means of which the pressure medium can be introduced into the pressure chamber.

Advantageously, the pressure chamber is connected by a conduit with a pressure relief valve.

In the method according to the invention, first an initial filling with the pressure medium is carried out. In this way, a closed clamping system is obtained with which the counter bearing or also tools can be subsequently clamped simply in that the pressure medium is mechanically pressurized by means of the piston. The piston in this context is displaced by a pressure element in order to pressurize the pressure medium with the appropriate pressure. By means of the pressure indicator, the adjustment of the clamping pressure is indicated here and can thus be controlled or monitored by the user. When the clamping action is to be released, the pressure element must only be moved mechanically in opposite direction so that the piston is returned by the pressure of the pressure medium.

Advantageously, a screw part, such as a threaded pin, is used as a pressure element. With it, the piston can be adjusted continuously so that the clamping pressure can be exactly adjusted. For actuating the screw part, only a simple tool, for example, a socket wrench is required.

The pressure indicator is advantageously a plunger which is acting as a piston loaded by the pressure medium which is displaced against a spring force by the pressure medium during the clamping process. The spring force ensures also that the plunger is returned again upon release of the clamping action.

The subject matter of the application not only results from the subject matter of the individual claims but also from all specifications and features disclosed in the drawings and the description. They are claimed as being important to the invention even though they are not subject matter of the claims, inasmuch as, individually or in combination, they are novel relative to the prior art.

Further features of the invention result from the additional claims, the description, and the drawings.

BRIEF DESCRIPTION OF THE DRAWING

The invention will be explained in more detail in the following based on an embodiment illustrated in the drawing.

DESCRIPTION OF THE PREFERRED EMBODIMENTS

Figure 1:
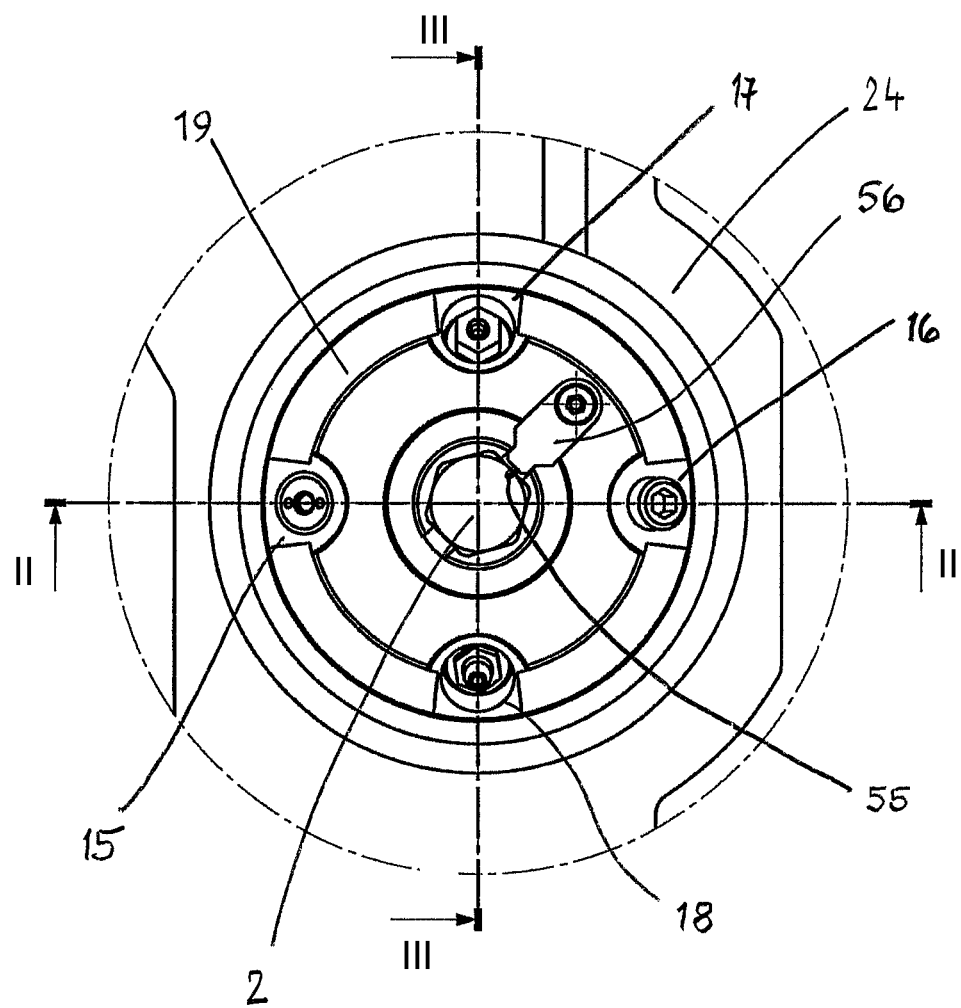
FIG. 1 shows an end view of a clamping device according to the invention.

The clamping device in the illustrated embodiment is part of a counter bearing that enables a play-free and centered connection with the spindle. It comprises a hydraulic expansion bushing 1 (FIG. 2) that surrounds a spindle pin 2. The hydraulic expansion bushing 1 is provided with a pressure chamber 3 which extends across a portion of the length and about the circumference of the hydraulic expansion bushing 1. In radial direction inwardly, the pressure chamber 3 is delimited by a thin-walled region 4 of the hydraulic expansion bushing 1 which, under the pressure of a pressure medium located in the pressure chamber, can be elastically deformed in radial direction inwardly in order to clamp the spindle pin.

The hydraulic expansion bushing 1 is housed in a through opening 5 of a bearing hub 6. The through opening 5 is delimited by a wall 7 which is provided with an annular shoulder 8 at which the hydraulic expansion bushing 1 is supported in an axial direction. For this purpose, the hydraulic expansion bushing 1 is provided at one end with a projecting radial flange 9 with which the hydraulic expansion bushing 1 is axially supported against the annular shoulder 8. On both sides of the annular pressure chamber 3, there are sealing rings 10, 11, preferably O-rings, which are placed into annular grooves 12, 13 at the outer circumference of the hydraulic expansion bushing 1 and ensure sealing between the hydraulic expansion bushing and the bearing hub 6.

The pressure chamber 3 is sufficiently long in order to be able to clamp the spindle pin 2 reliably. It projects with its two ends past the bearing hub 6 and comprises at its lower end, in FIG. 2, a thread 57 for the spindle nut and a partial region 58 for a securing ring. Also visible is a portion of a tool receptacle 59.

The hydraulic expansion bushing 1 is flush with its one end with an outer side 14 of the bearing hub 6 while the other end comprising the radial flange 9 is positioned within the through opening 5.

The bearing hub 6 is provided with a pressure indicator 15 and a pressure generator 16 with which the pressure medium contained in the pressure chamber 3 can be pressurized.

Figure 3:
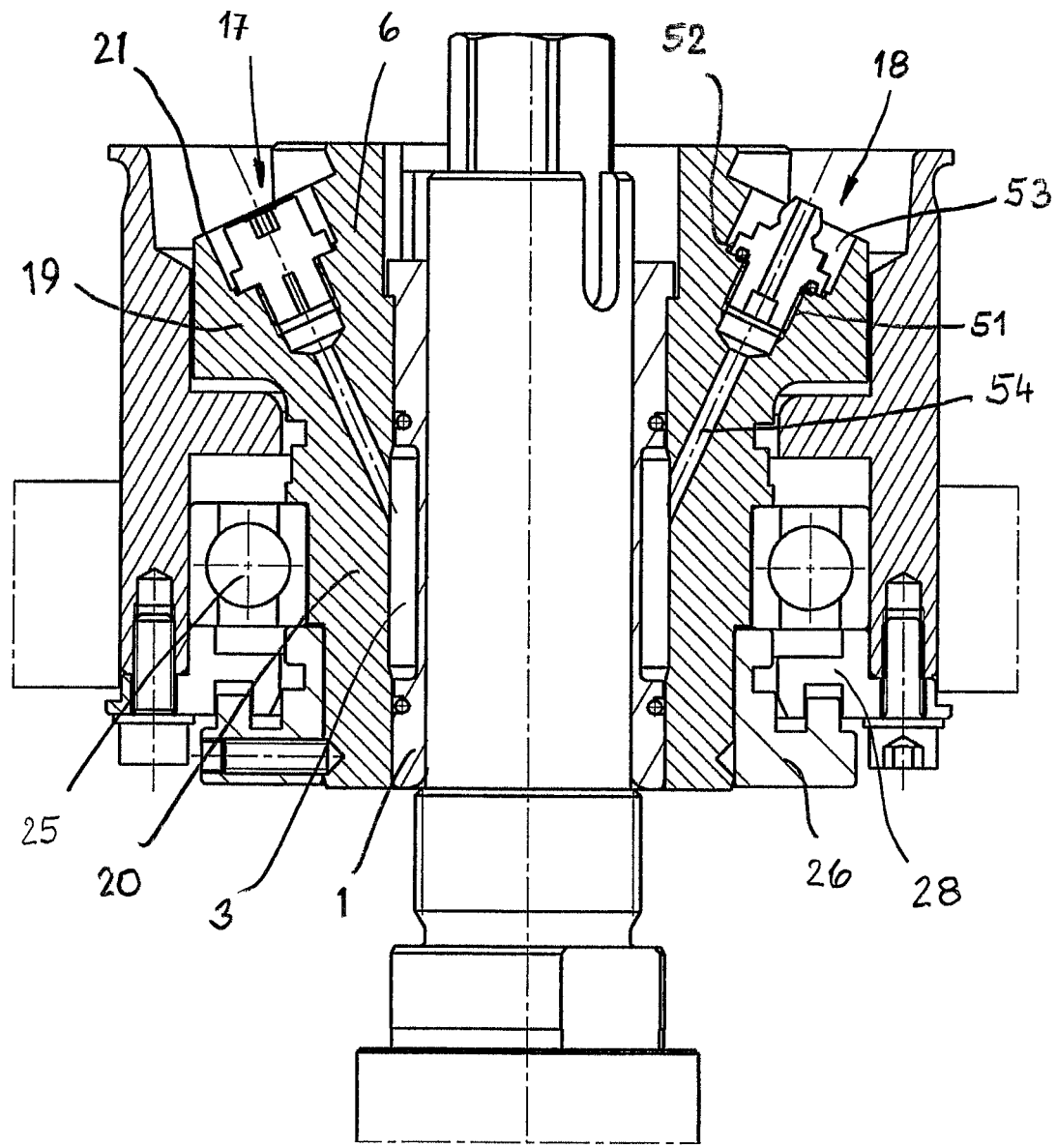
FIG. 3 shows a section along the section line III-III in FIG. 1.

The bearing hub 6 is also provided with a valve 17 for venting during the initial filling with pressure medium and for the pressure relief in the pressure chamber 3 and with a connector 18 (FIG. 3) by means of which the pressure medium can be filled into the pressure chamber 3.

As can be seen in FIG. 1, the pressure indicator 15, the pressure generator 16, the pressure relief valve 17, and the connector 18 are advantageously positioned, displaced by 90° relative to each other, at one end face of the bearing hub 6. Depending on the configuration of the bearing hub 6, these parts 15 to 18 can also be provided at another location and in another distribution at the bearing hub 6.

In the region of the parts 15 to 18, the bearing hub 6 is advantageously embodied wider so that sufficient installation space for these parts is available. The widened portion is formed by an annular flange 19 that is provided near one end of the bearing hub 6 and projects radially away from a bushing-shaped base body 20 of the bearing hub. The base body 20 comprises the through opening 5 for receiving the hydraulic expansion bushing 1.

The bearing hub 6 is surrounded by a sliding bushing 22 that surrounds the bearing hub 6 almost across its entire length. The sliding bushing 22 is provided at the inner side with a radially projecting ring 23 with which the sliding bushing 22 engages from behind the annular flange 19 of the bearing hub 6. The sliding bushing 22 in the embodiment is secured at a receiving plate 24 so as to be axially slidable and is moved by an axial adjustment of the spindle together with it in axial direction. The receiving plate 24 is advantageously fastened to a counter bearing plate which, in turn, is arranged at the machine stand.

At the side of the ring 23 facing away from the parts 15 to 18, at least one rotary bearing 25 is provided which in the embodiment is a roller bearing. The bearing hub 6 is rotatably supported in the sliding bushing 22 by the rotary bearing 25.

The rotary bearing 25 is axially clamped by means of a clamping ring 26 against an annular shoulder 27 at the outer side of the base body 20. The clamping ring 26 is pushed onto the lower end, in FIGS. 2 and 3, of the base body 20 of the bearing hub 6 and is secured thereat by a threaded pin 60.

Between the clamping ring 26 and the rotary bearing 25, a sealing ring 28 is positioned whose outer rim is secured by screws 29 to the end face of the sliding bushing 22. The sealing ring 28 and the clamping ring 26 are designed such that they form a labyrinth seal which is positioned upstream of the rotary bearing 25. The sealing ring 28 has a radially outwardly projecting annular shoulder 61 which together with an oppositely positioned annular shoulder 62 arranged at the sliding bushing 22 determines an axial sliding region of the sliding bushing 22 in the receiving plate 24. In this way, it is additionally prevented that the counter bearing can fall out of the receiving plate 24.

Figure 4:
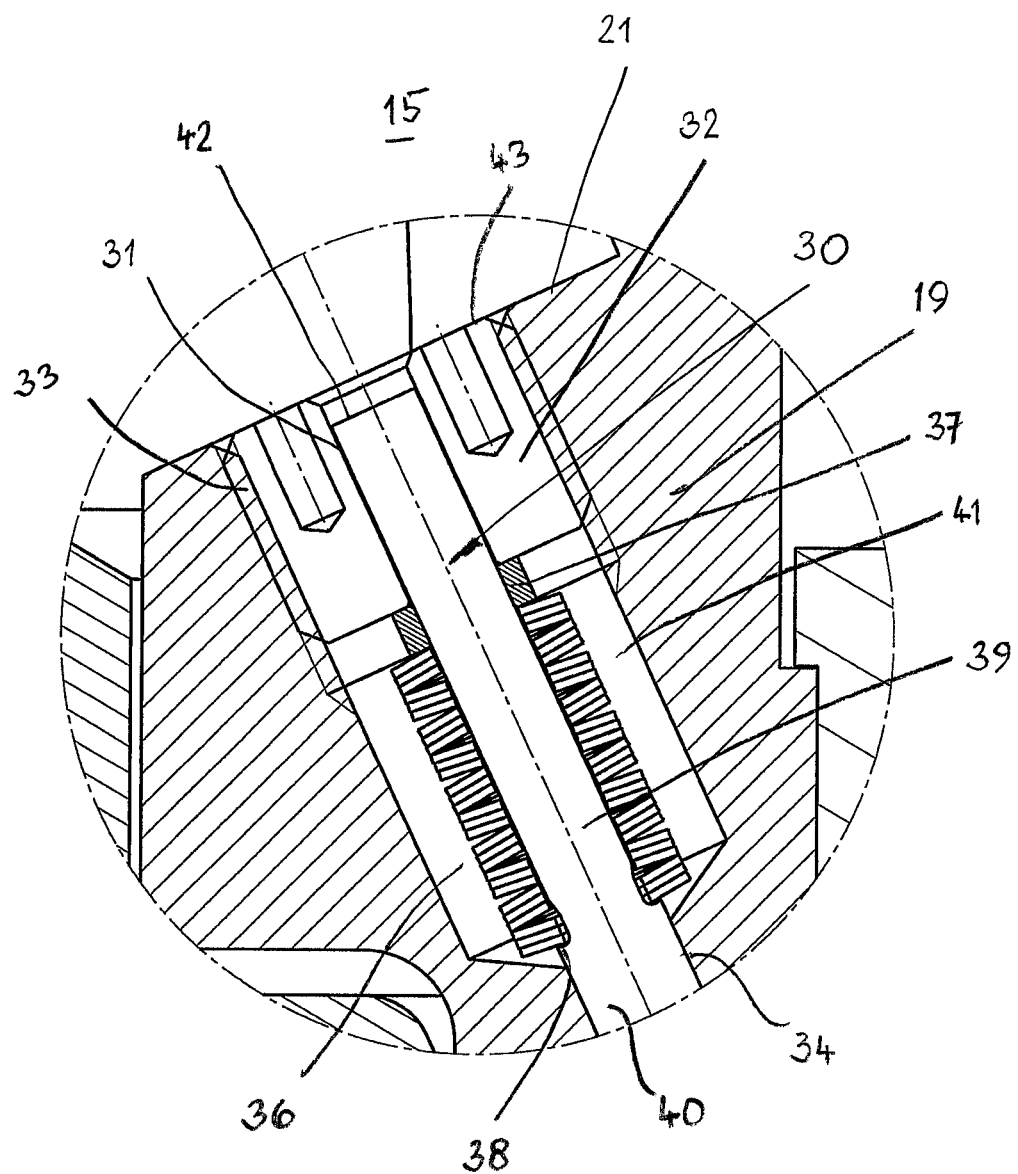
FIG. 4 shows the detail IV in FIG. 2 in enlarged illustration.

The pressure indicator 15 (FIG. 4) has a plunger 30 which with its one end projects into a through opening 31 of a threaded sleeve 32 which is screwed into a threaded bore 33 opening at the end face 21 of the annular flange 19. Advantageously, the end face of the threaded sleeve 33 lies flush with the end face 21 of the annular flange 19.

Figure 2:
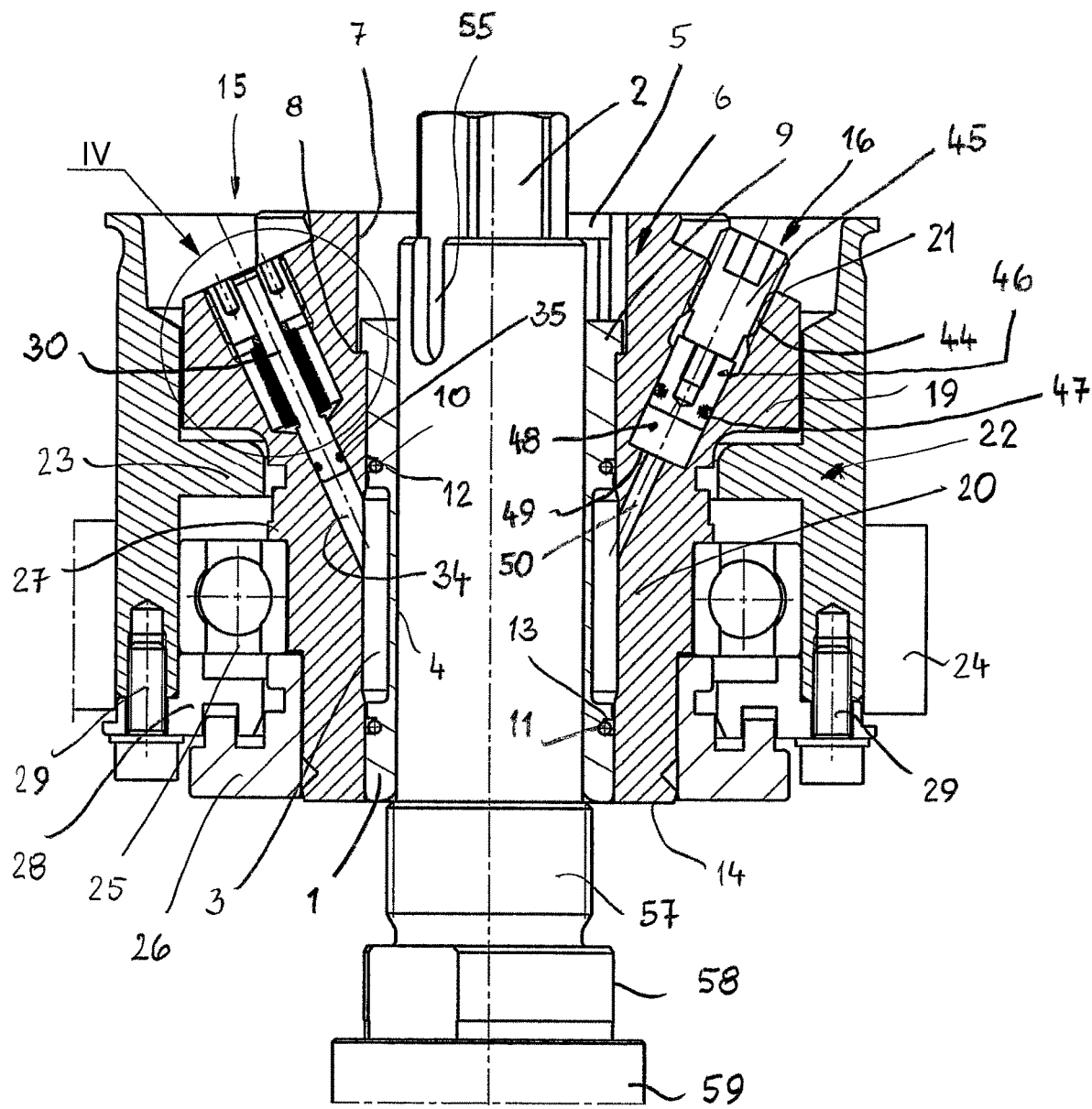
FIG. 2 shows a section along the section line II-II in FIG. 1.

The plunger 30 projects into a bore 34 which is provided in the base body 20 of the bearing hub 6 and opens into the pressure chamber 3 (FIG. 2). The part of the plunger 30 which is positioned in the bore 34 is sealed by means of a sealing ring 35, preferably an O-ring, relative to the wall of the bore 34 (FIG. 2).

The plunger 30 is surrounded in the region outside of the bore 34 by at least one pressure spring 36 which in the embodiment is formed by a plate spring stack wherein the individual plate springs are stacked on each other and the stacks are oriented oppositely relative to each other. The end of the pressure spring 36 which is facing the threaded sleeve 32 is supported with interposition of a spacer disk 37 against the threaded sleeve 32. The other end of the pressure spring 36 is resting against a step 38 (FIG. 4) which is formed at a transition from a plunger part 39 with a smaller diameter to a plunger part 40 of larger diameter.

The pressure spring 36 is positioned in a receiving space 41 which is provided in the region of the annular flange 19 of the bearing hub 6 and has a greater diameter than the bore 34 opening into it and continues into the threaded bore 33 in outward direction.

The spacer disk 37 serves for compensating spring tolerances so that the function of the plunger 30, still to be described, is ensured always.

The plunger part 40 which projects into the bore 34 forms a piston which is loaded by the medium under pressure contained in the pressure chamber 3.

When the pressure chamber 3 is filled with the medium, in general hydraulic grease, and loaded with pressure, the plunger 30 is moved outwardly. By the force of the pressure medium which is acting on the piston 40, the plunger 30 is moved out to a point where a force balance between the force acting on the piston 40 and the oppositely acting force of the pressure spring 36 is reached. The adjustment of the spring force is selected advantageously such that in the clamped state the plunger 30 with its end face 42 lies flush with the end face 43 of the threaded sleeve 32. Then the pressure in the pressure chamber 3 is sufficiently high in order to safely clamp the spindle pin 2. Since the end associated with the plunger part 40 is guided in the bore 34 in a seal-tight manner, a reliable pressure indicator is ensured by the plunger 30.

The pressure indicator can be realized also by a marking on the plunger 38 such as an annular groove, a marking, and the like.

The pressure generator 16 has a threaded pin 45 (FIG. 2) screwed into a threaded bore 44 and interacting with a piston 46 which is seal-tightly slidable within a piston chamber 44 due to a sealing ring 47.

The threaded bore 44 opens at the end face 21 of the annular flange 19 of the bearing hub 6. By means of the threaded pin 45, the piston 46 in the piston chamber 48 can be adjusted. The piston 46 can also be connected detachably with the threaded pin 45 or can be monolithically embodied with it.

At the bottom 49 of the piston chamber 48, a bore 50 opens which connects the piston chamber 48 with the pressure chamber 3. The bore 50 which is provided in the base body 20 of the bearing hub 6 has smaller diameter than the piston chamber 48 which is provided substantially in the region of the annular flange 19.

The threaded pin 45 projects advantageously past the end face 21 of the annular flange 19 so that the threaded pin 45 can be adjusted with a corresponding tool in a comfortable way.

Advantageously, the sliding bushing 22 projects past the annular flange 19 axially so far that the sliding bushing 22 axially projects past the threaded pin 45.

By means of the threaded pin 45, the medium contained in the pressure chamber 3 is pressurized in that the piston 47 is moved inwardly by turning the threaded pin 45. The pressure medium is located not only in the pressure chamber 3 but also in the bores 34, 50 and in the piston chamber 48 so that minimal adjustment travels of the piston 46 are sufficient to pressurize the medium. By turning the threaded pin 45 during the clamping process, the plunger 30 of the pressure indicator 15 is moved out of its initial position illustrated in FIG. 4 against the force of the pressure spring 36 such that the end face 42 of the plunger 30 lies flush with the end face 43 of the threaded sleeve 33. Since the threaded pin 45 and the pressure indicator 15 are provided at the same end face of the annular flange 19, the user can adjust, control, and monitor very easily the required clamping pressure.

For filling the pressure chamber 3 with the pressure medium, the connector 18 (FIG. 3) is provided which is designed as a high-pressure nipple. It is inserted into a bore 51 which opens at the bottom 52 of the recess 53 which is provided in the end face 21 of the annular flange 19 of the bearing hub 6. A supply bore 54 opens into the bore 51 and connects the bore 51 with the pressure chamber 3.

To the connector 18, a high-pressure grease press is connected in an exemplary fashion by means of which the grease to be pressurized as a pressure medium is filled into the pressure chamber 3.

The pressure relief valve 17 is also provided at the end face 21 of the annular flange 19. It serves primarily for venting during filling with pressure medium. With the valve 17, as needed, also pressure can be decreased in that, when opened, a minimal quantity of pressure medium can escape to the exterior.

For the initial filling, the threaded pin 45 is screwed in so far that the piston 46 is contacting the bottom 49 of the piston chamber 48. Through the connector 18, the pressure medium is filled in by means of the high-pressure grease press, initially with open pressure relief valve 17, until the system is vented, i.e., completely filled with grease. Subsequently, the pressure relief valve 17 is closed and the pressure medium is filled in so far that the plunger 30 with its end face 42 lies flush with the end face 43 of the threaded sleeve 32. When the high-pressure grease press itself has a pressure gauge, then by means of the pressure gauge the pressure can be read. For pressure relief, the threaded pin 45 can now be turned back so far until the pressure is relieved. The subsequent clamping processes are always carried out such that the threaded pin 45 is screwed in to meet the stop so that automatically the correct clamping pressure is built up. It is indicated by the pressure indicator and controlled by the operator.

The filling process can also be carried out such that the threaded pin 45 is turned back into its other end position. Filling with the pressure medium is realized in this case without pressure build-up. As soon as the filling process is completed, the threaded pin 45 is screwed into the threaded bore 44 so that the piston 46 pressurizes the pressure medium. The threaded pin 45 is screwed in to a point where the correct clamping pressure is indicated at the pressure indicator 15.

The spindle pin 2 is provided with an axial follower groove 55 which is engaged by a torque follower 56 (FIG. 1). It is fastened to the end face of the bearing hub 6.

With the described counter bearing, a simple and fast assembly is possible. For pressure generation, it is only necessary to turn the threaded pin 45 with a corresponding tool in order to generate the clamping pressure in the pressure chamber 3. The threaded pin 45 is advantageously designed as a hexagon socket screw which can be rotated about its axis with a corresponding wrench.

By means of the pressure indicator 15, a simple clamping action control can be provided. For release of the clamping action, the threaded pin 46 with the tool is simply turned oppositely. The tool for turning the threaded pin 45 can be carried along by the user. During the clamping and release processes, no pressure medium will escape to the exterior so that clean working is ensured.

A possible leakage of pressure medium can be compensated at any time by refilling the medium via the connector 18, should this be required.

Minimal leakages can be compensated by the plunger 30. Since it is pretensioned by the pressure spring 36, the plunger 30 in case of minimal leakages is readjusted by the pressure spring 36 such that a sufficient pressure for reliable clamping is maintained.

The described clamping system constitutes a closed system. The pressure medium upon initial filling by means of a high-pressure grease press is filled in through the connector 18. Since the bearing hub 6 comprises the pressure indicator 15, the grease press must not comprise a pressure gauge because the correct pressure can be indicated by the pressure indicator 15. For initial filling of the system and for control of the correct indication of the pressure indicator 15, a pressure gauge is however advantageous.

For clamping and for releasing the spindle pin 2, only the tool required for actuating the threaded pin 45 is needed which, for example, can be a socket wrench. It can also be used for other actuations when setting up a machine. Therefore, for setting up a machine only a few tools are required.

By means of the pressure indicator 15, it can be controlled at any time whether the clamping action can still be ensured with the desired clamping force. This is advisable every day and every time the machine is switched on. In this context, the complex manipulation of a grease press is no longer needed by means of which up to now the correct clamping action must be controlled. For this purpose, the grease press must be connected to the connector 18 every time and pumped up to the desired pressure which must be read out by the pressure gauge.

The closed system for clamping has been described with the aid of a counter bearing for a spindle pin 2. It is possible to employ the described closed system for clamping tools on a spindle in the same way. In this case, the elements 15 to 18 are provided in the base body of the tool to which the knives and the like required for machining workpieces are fastened.

Since tools, depending on the rotational direction, are mounted in different orientations on the machining spindles, they advantageously have at both end faces the pressure indicator 15 and the pressure generator 16 which are each connected to the pressure chamber 3. Long tools can also be embodied with one expansion bushing each at the oppositely positioned sides. In this case, the pressure chambers 3 of both expansion bushings 1 as well as the end face-associated pressure indicators 15 and pressure generators 16 are connected by bores in the tool base body with each other so that here also a closed system is existing. It is not required to provide the connector 18 for filling and the pressure relief valve 17 at both end faces. It is sufficient to arrange it at one end face or advantageously at the circumference of the tool base body because they are not needed for the normal tool clamping action but only for initial filling and, as needed, for later refilling or follow-up control.

What is claimed is:

1. A counter bearing configured to rotatably support a machining spindle of woodworking machines, the counter bearing comprising:
 a bearing hub (6) rotatably supported in at least one rotary bearing (25);
 at least one expansion bushing disposed directly inside a through opening of the bearing hub (6), wherein the expansion bushing comprises an elastically deformable wall configured to accommodate therein the machining spindle, wherein the elastically deformable wall delimits at least one pressure chamber, wherein the pressure chamber accommodates a pressure medium;
 a supply line for the pressure medium opening into the pressure chamber;
 a pressure conduit (50) opening into the pressure chamber (3);
 a mechanically actuatable pressure element (45) disposed in the pressure conduit and configured to be actuated by an actuating tool;
 a piston (47) slidably arranged in the pressure conduit (5) and configured to be actuated by the pressure element (45), wherein the piston is configured to load the pressure medium.

2. The counter bearing according to claim 1, wherein the pressure element (45) is seated in a threaded bore (44).

3. The counter bearing according to claim 2, wherein the pressure element (45) is a threaded pin.

4. The counter bearing according to claim 1, wherein the piston (47) is slidable seal-tightly in a piston chamber (48).

5. The counter bearing according to claim 1, further comprising a pressure indicator (15), wherein the pressure chamber (3) is connected by a conduit to the pressure indicator (15).

6. The counter bearing according to claim 5, wherein the pressure indicator (15) is disposed in the bearing hub (6) and comprises a plunger (30) seated in a bore (34) of the bearing hub (6), the bore (34) opening into the pressure chamber (3), wherein the plunger (30) is slidable seal-tightly in the bore (34).

7. The counter bearing according to claim 6, wherein the plunger (30) is spring-loaded toward the pressure chamber (3).

8. The counter bearing according to claim 6, wherein the plunger (30) is surrounded by a plate spring stack (36)

having a first end supported against a stop (38) provided at the plunger (30) and a second end supported against a securing part (32).

9. The counter bearing according to claim 8, wherein the securing part (32) is a threaded sleeve that is screwed into a threaded bore (33) and comprises a through opening (31), wherein the plunger (30) projects into the through opening.

10. The counter bearing according to claim 1, wherein the pressure chamber (3) is connected by a conduit to a connector (18) for filling the pressure chamber with the pressure medium.

11. The counter bearing according to claim 1, wherein the pressure chamber (3) is connected by a conduit to a pressure relief valve (17).

12. A method for clamping counter bearings configured to rotatably support a machining spindle of woodworking machines, the method comprising:
    providing a bearing hub rotatably supported in a rotary bearing;
    providing an expansion bushing arranged directly inside a through bore of the bearing hub and comprising an elastically deformable wall configured to accommodate therein the machining spindle, wherein the elastically deformable wall delimits a pressure chamber filled with a pressure medium, pressurizing the pressure medium during the clamping process by a piston (46) by mechanically moving a pressure element (45) to thereby elastically deform radially inwardly the elastically deformable wall to clamp the machining spindle, and
    indicating by a pressure indicator (15) the adjustment of the clamping pressure.

13. The method according to claim 12, wherein the pressure element (45) is a screw part.

14. The method according to claim 12, wherein the pressure indicator (15) comprises a plunger (30) loaded by the pressure medium and acting as a piston displaced against a spring force by the pressure medium.

15. The method according to claim 12, further comprising arranging the pressure indicator (15) within the bearing hub (6).

16. A method for clamping a tool on a machining spindle of woodworking machines, the method comprising:
    providing an expansion bushing arranged in a base body of a tool and comprising an elastically deformable wall delimiting a pressure chamber filled with a pressure medium,
    positioning the machining spindle inside the elastically deformable wall, pressurizing the pressure medium during the clamping process by a piston by mechanically moving a pressure element to thereby elastically deform radially inwardly the elastically deformable wall to clamp the tool on the machining spindle,
    indicating by a pressure indicator the adjustment of the clamping pressure.

17. The method according to claim 16, further comprising arranging the pressure indicator within the base body of the tool.

18. A counter bearing configured to rotatably support a machining spindle of woodworking machines, the counter bearing comprising:
    a bearing hub (6) rotatably supported in at least one rotary bearing (25);
    at least one expansion bushing disposed directly inside a through opening of the bearing hub (6), wherein the expansion bushing comprises an elastically deformable wall configured to accommodate therein the machining spindle, wherein the elastically deformable wall delimits at least one pressure chamber, wherein the pressure chamber accommodates a pressure medium;
    a sliding bushing (22) surrounding the bearing hub (6) and axially fixed to the machining spindle so as to move together with the machining spindle in an axial direction of the machining spindle when the machining spindle is moved in the axial direction;
    a supply line for the pressure medium opening into the pressure chamber;
    a pressure conduit (50) opening into the pressure chamber (3);
    a mechanically actuatable pressure element (45) disposed in the pressure conduit and configured to be actuated by an actuating tool;
    a piston (47) slidably arranged in the pressure conduit (5) and configured to be actuated by the pressure element (45), wherein the piston is configured to load the pressure medium.

* * * * *